(12) United States Patent
Belzile (10) Patent No.: US 11,958,224 B2
(45) Date of Patent: Apr. 16, 2024

(54) SHOOTING POT REFILL TIMING

(71) Applicants: Husky Injection Molding Systems Ltd., Bolton (CA); Manon Danielle Belzile, Fairfield, VT (US)

(72) Inventor: Manon Danielle Belzile, Fairfield, VT (US)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 720 days.

(21) Appl. No.: 15/775,401

(22) PCT Filed: Nov. 4, 2016

(86) PCT No.: PCT/US2016/060430
§ 371 (c)(1),
(2) Date: May 11, 2018

(87) PCT Pub. No.: WO2017/083180
PCT Pub. Date: May 18, 2017

(65) Prior Publication Data
US 2018/0354178 A1 Dec. 13, 2018

Related U.S. Application Data

(60) Provisional application No. 62/253,888, filed on Nov. 11, 2015.

(51) Int. Cl.
*B29C 45/76* (2006.01)
*B29C 45/02* (2006.01)
(Continued)

(52) U.S. Cl.
CPC ............ *B29C 45/762* (2013.01); *B29C 45/02* (2013.01); *B29C 45/76* (2013.01); *B29C 45/27* (2013.01);
(Continued)

(58) Field of Classification Search
CPC ... B29C 45/762; B29C 45/76; B29C 45/7613; B29C 45/70; B29C 45/46; B29C 45/461; B29C 45/462; B29C 2045/465; B29C 2045/466; B29C 45/27036; B29C 45/2703; B29C 45/2704; B29C 2045/2712;
(Continued)

(56) References Cited

U.S. PATENT DOCUMENTS 4,722,679 A 2/1988 Farrell
6,152,721 A * 11/2000 Schad ............... B29C 45/02
264/328.8
(Continued)

FOREIGN PATENT DOCUMENTS

EP 0393389 A2 10/1990
EP 0943412 A2 9/1999
(Continued)

OTHER PUBLICATIONS

PCT International search report, dated Jan. 31, 2017, 4 pages.

*Primary Examiner* — Stella K Yi (57) ABSTRACT

Disclosed is a method of refilling a shooting pot cavity in a molding system, the method comprising: determining that a trigger event has occurred in the molding system; and coordinating a refill of the shooting pot cavity with the occurrence of the trigger event.

15 Claims, 4 Drawing Sheets

(51) Int. Cl.
*B29C 45/27* (2006.01)
*B29K 105/00* (2006.01)

(52) U.S. Cl.
CPC .............. *B29C 2945/76648* (2013.01); *B29C 2945/76752* (2013.01); *B29K 2105/258* (2013.01)

(58) Field of Classification Search
CPC ..... B29C 45/18; B29C 45/1808; B29C 31/04; B29C 31/06; B29C 39/24; B29C 2043/5875; B29C 45/1866; B29C 2045/0089; B29C 2045/2687; B29C 2045/2691
See application file for complete search history.

(56) References Cited

U.S. PATENT DOCUMENTS

2006/0006563 A1* 1/2006 Serniuck ............. B29C 45/1603
264/40.1
2012/0276235 A1* 11/2012 Belzile .................. B29C 45/02
425/150
2013/0236584 A1 9/2013 Weber

FOREIGN PATENT DOCUMENTS

| JP | S62268618 | 11/1987 |
|---|---|---|
| JP | H0397517 | 4/1991 |
| JP | H04286617 | 10/1992 |
| JP | H06114883 | 4/1994 |
| JP | 11138611 * | 11/1997 |
| WO | 2011081694 A1 | 7/2011 |

* cited by examiner

SHOOTING POT REFILL TIMING

TECHNICAL FIELD

The present disclosure relates to injection molding machines and in particular to shooting pots.

BACKGROUND

Injection molding machines generally include a hopper for receiving resin, a barrel connected to the hopper and a screw that moves within the barrel to impart a force onto the resin to melt and move the resin along the barrel. The melted resin is injected from the barrel into a melt passage apparatus that defines one or more melt passage. The melted resin passes through the melt passage(s) to one or more nozzle. The melted resin is then expelled into a mold cavity through a gate. The mold cavity can be formed by clamping two mold plates together.

SUMMARY

In one aspect, disclosed is a method of refilling a shooting pot cavity in a molding system, the method comprising: determining that a trigger event has occurred in the molding system; and coordinating a refill of the shooting pot cavity with the occurrence of the trigger event.

In another aspect, disclosed is a control system for controlling a shooting pot plunger in a molding system, the control system comprising: a memory for storing instructions; a controller comprising a processor for executing instructions stored on memory to: determining that a trigger event has occurred in the molding system; and coordinating a refill of the shooting pot cavity with the occurrence of the trigger event.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference numerals are used in the drawings to identify like elements and features.

DETAILED DESCRIPTION

Disclosed generally is a process to control the timing of or to coordinate refilling one or more shooting pots. The refilling of the shooting pot cavity is generally dependent on the occurrence of a predetermined event. For example, the injection molding unit or the shooting pot plunger or both can be controlled so that shooting pot cavity is filled at or shortly after a specific event in the molding system occurs.

For example, a controller or multiple controllers in communication with each other can be used to coordinate the injection of melted resin from an injection unit with another event or occurrence in the molding system. One of the controllers can control the shooting pot plunger (for handling the refill of the shooting pot cavity) and another controller can control the injection unit. These two controllers can communicate with each other to coordinate the operation of the shooting pot plunger and the injection unit.

The Molding System 100

Figure 1:
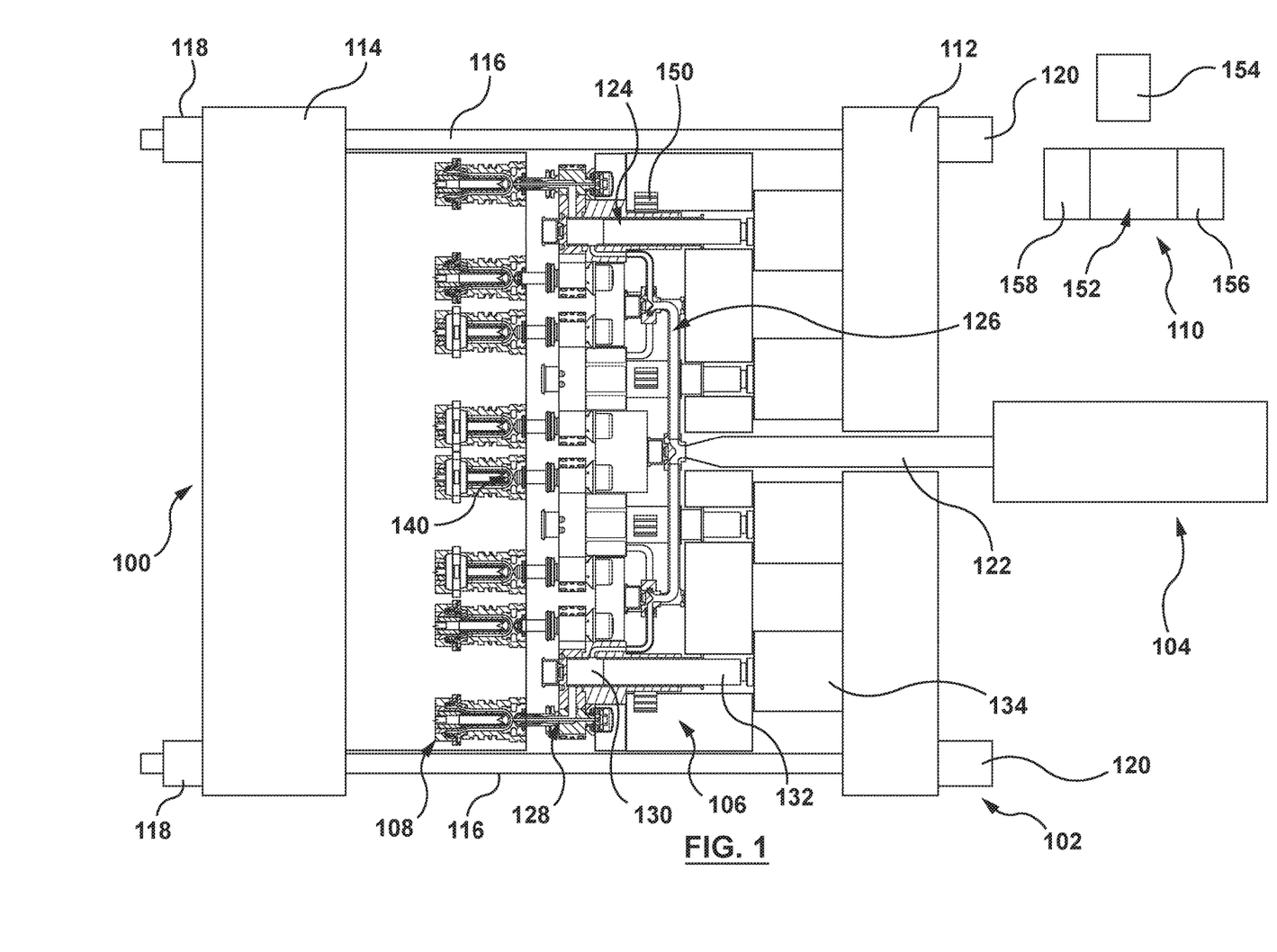
FIG. 1 is a cross sectional side view of a molding system.

FIG. 1 shows an example of a molding system 100. The molding system 100 includes a clamp assembly 102, an injection unit 104, a melt distribution assembly 106, a mold assembly 108 and a control system 110. In the illustrated embodiments the molding system 100 is used for manufacturing preforms. In alternative embodiments, the molding system 100 can be adapted to manufacture other molded articles, such as thin wall containers for subsequent blow molding into final shaped containers, medical appliances, and closures.

The clamp assembly 102 includes a stationary platen 112, a movable platen 114, tie bars 116, a lock unit 118 and a clamp unit 120. Alternatively, the clamp assembly 102 can have three platens with a movable platen moving between two stationary platens.

The injection unit 104 in the FIG. 1 is shown in schematic. The injection unit 104 generally includes a hopper or other inlet, a barrel, a screw and a machine nozzle 122. The hopper or other inlet is an opening connected to the barrel and is used to receive resin. The resin passes through the hopper or other inlet into the barrel. The screw is housed in the barrel and can rotate and move linearly to melt and move the resin in the barrel. There may be alternative or additional ways of melting or moving the resin, such as using heaters on the barrel.

The machine nozzle 122 is connected to an end of the barrel. The machine nozzle 122 provides a passage from the melted resin to the melt distribution assembly 106. For example, the screw can inject the resin from the barrel through the machine nozzle 122 and into the melt distribution assembly 106. Different mechanisms for transferring resin to the melt distribution assembly 106 can be used, such as a machine shooting pot. The machine nozzle 122 can pass through a plate 105 proximate the fluid connection of the machine nozzle 122 and melt distribution assembly 106.

The melt distribution assembly 106 includes a manifold 126 defining refill passages 198 and injection passages 199, one or more shooting pots 124, and one or more nozzle assemblies 128. For ease of reference the manifold is not fully shown in FIG. 1.

The refill melt passages 198 extend from an outlet of the machine nozzle 122. The outlet of the machine nozzle 122 can fluidly connect to a bushing and the refill melt passage 198 can extend from the bushing, for example. The refill melt passage 198 branch from the outlet of the machine nozzle 122 or from the bushing and each fluidly connect to a shooting pot cavity 130. There may be multiple branches of the refill melt passage 198 between the machine nozzle 122 and the shooting pot cavity 130.

The shooting pots 124 each include a shooting pot cavity 130, a shooting pot plunger 132 and a shooting pot actuator 134. The refill melt passages 198 lead to an inlet to the shooting pot cavity 130. The refill melt passages 198 connecting the injection unit 104 to the shooting pot cavity 130 can also be called the refill circuit.

The shooting pot cavity 130 has an outlet, leading to a respective injection melt passage 199. Each shooting pot cavity 130 leads to a separate respective injection melt passage 199.

The mold assembly 108 includes a stationary mold portion and a movable mold portion that cooperate to define one or more mold cavities 140. The stationary mold portion is associated with the stationary platen 112. For example, the stationary mold portion can be connected to the stationary platen 112. The movable mold portion is associated with the movable platen 114. For example, when the movable platen 114 moves relative to the stationary platen 112 the movable mold portion similarly moves relative to the stationary mold portion. In FIG. 1, the mold assembly 108 is shown in simplified form.

Each injection melt passage 199 leads eventually to a respective mold cavity 140. For example the injection melt passage 199 first leads to a shooting pot cavity 130 and then to a nozzle assembly 128 and then to the respective mold cavity 140. Generally Resin flows from the injection unit 104, through the refill melt passage 198 and into the shooting pot cavity 130. The resin is then expelled from the shooting pot cavity into the injection melt passage 199, through the nozzle assembly 128 and then into the mold cavity 140. As such the injection melt passage 199 may be partially defined in the nozzle assembly 128 and in the manifold 126, for example.

The mold cavities 140 are each fluidly connected to a respective outlet of the injection melt passage 199 for receiving resin.

The control system 110 includes a controller 152 and a database 154. Another form of memory can be used instead of or in addition to a database 154. The database 154 can be remote from the control system 110. The control system 110 is generally shown in schematic in FIG. 1. In some embodiments, the control system 110 can also include a sensor 150 or can be in communication with one or more sensor 150.

The sensor 150 is used to measure events or properties at certain locations in the molding system 100. There can be more than one sensor 150. For example, there can be one sensor 150 associated with each shooting pot 124. Or there can be sensors 150 that measure different properties of the resin. Or there can be sensors 150 that measure properties of the resin at different locations in the molding system 100. Or there can be sensors 150 that measure the position of one or more moving parts in the molding system 100. By way of example, the one or more sensor 150 can be located proximate the shooting pot cavity 130, proximate to the mold cavity 140 or proximate to the injection mold passage 199.

The controller 152 can include a computer or processor that can execute instructions stored on a memory. The memory can be considered part of the controller 152. The controller 152 can execute instructions in order to actuate the shooting pot plunger 132. Similarly, the controller 152 can execute instructions to actuate other components of the molding system 100 such as the valve stems 208 or injection unit 104. Alternatively, there may be an injection unit controller that is dedicated to actuating the injection unit 104 in order to inject resin, in which case the injection unit controller can be in communication with (or capable of communicating with) the controller 152.

The controller 152 can communicate with the database 154 and the sensor 150. For example, the controller may communicate through a wireless or wired connection with the database 154 or sensor 150.

The controller 152 can be attached to a portion of the molding system 100. The controller 152 or control system 110 can be considered part of the molding system 100. Alternatively, the controller 152 can be remote from the molding system 100 and can communicate through a wired or wireless communication network with other components of the molding system such as the database 154 and (optionally) sensor 150.

The database 154 is a physical memory for storing data such as measurements from the sensor 150 and instructions for the controller 152.

The control system 110 can also include a user interface 156. The user interface 156 can be connected to or be a part of the controller 152. The user interface 156 can be a display and can also have an input device. The input device can consist of a touch screen display, a keyboard, or buttons with specific associated functions, for example. The user interface 156 can have an output device, such as the display, speakers or lights that are illuminated in response to certain conditions (as dictated by the controller, for example).

The control system 110 can also include a timer 158 associated with the controller 152. The timer 158 can be used to time an injection cycle. By way of further example, the timer 158 can also be used to time specific operations in an injection cycle, such as the hold phase. In this way the control system 110 will know when certain operations are expected to occur.

Figure 2:
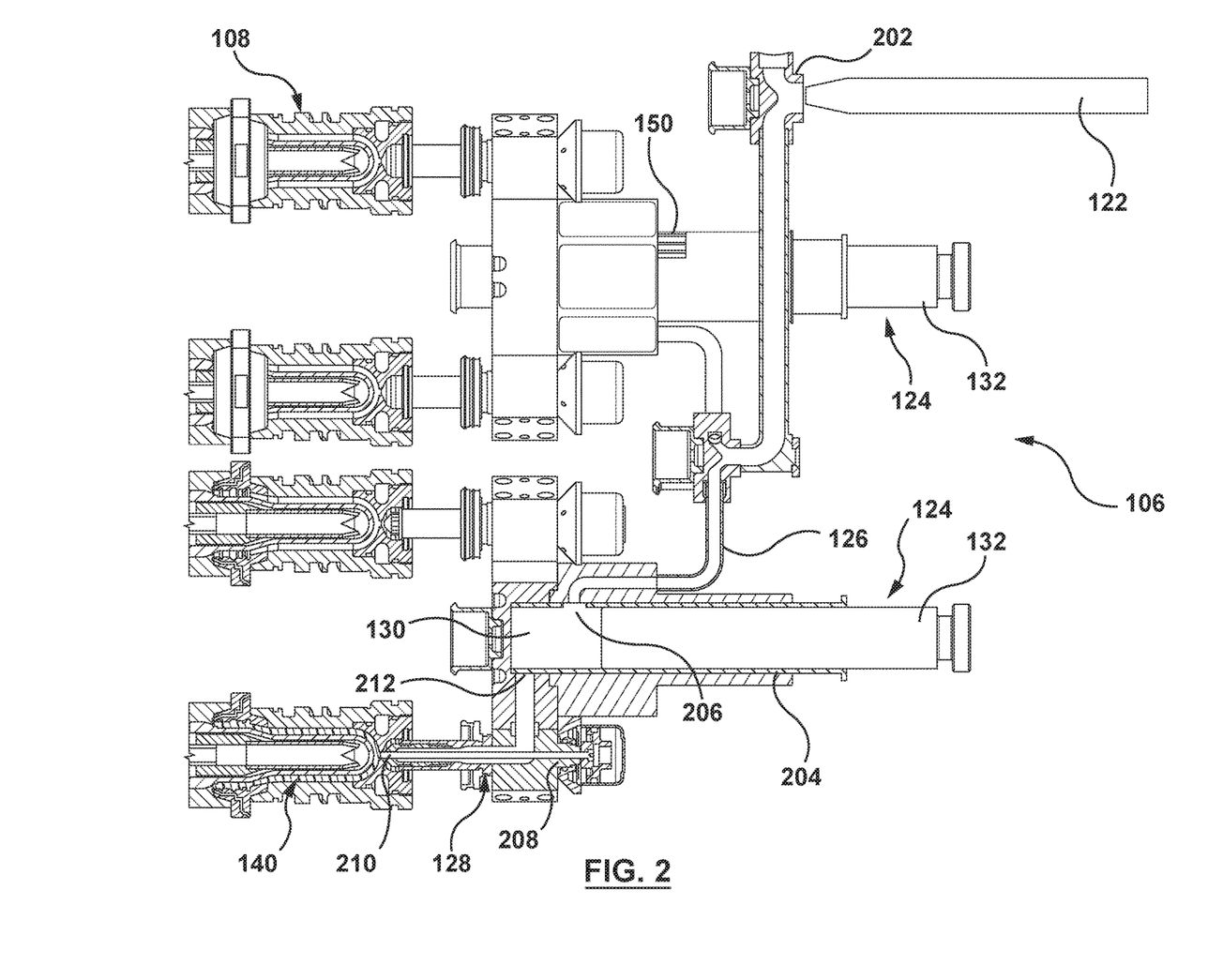
FIG. 2 is a side view of a portion of the molding system of FIG. 1.

FIG. 2 shows portions of the molding system 100 in more detail including the machine nozzle 122, a shooting pot 124, another shooting pot 124 shown cut away, a portion of the refill melt passage 198, an injection melt passage 199, the nozzle assembly 128, and mold cavities 140.

In the depicted embodiments, the machine nozzle 122 connects to a splitter 202 at an inlet of the refill melt passage 198. The splitter 202 diverts the resin into two (or more) distinct portions of the refill melt passage 198. Each distinct portion of the refill melt passage 198 leads, eventually, to one or more shooting pot 124. A portion of the refill melt passage 198 is shown cut away. The refill melt passage 198 leads from the splitter 202 to a secondary splitter 202. The secondary splitter 202 again splits the refill melt passage 198 so that it leads to one or more shooting pot 124. A portion of the refill melt passage 198 leads from the secondary splitter 202 through a shooting pot inlet 206 to the shooting pot cavity 130. The shooting pot cavity 130 is defined within a shooting pot housing 204. The shooting pot inlet 206 is a fluid connection in between the shooting pot cavity 130 and the refill melt passage 198 for allowing resin to flow through. For example, the shooting pot inlet 206 can be a hole in the shooting pot housing 204 that is connected to the refill melt passage 198. The portion of the refill melt passage 198 that leads from the machine nozzle 122 to the shooting pot 124 (i.e. to the shooting pot cavity 130) can be called the "refill circuit." In implementations in which the sensor 150 is a pressure sensor, the sensor 150 can be disposed within or proximate to the refill circuit.

The shooting pot housing 204 has a shooting pot outlet 212 that leads to an injection melt passage 199 which in turn fluidly connects to or passes through a nozzle assembly 128. For example, the nozzle assembly 128 can define a portion of the injection melt passage 199. The shooting pot outlet 212 can be a hole in the shooting pot housing 204, for example. In the embodiment shown in FIG. 2, the nozzle assembly 128 includes a valve gated nozzle assembly 128, a valve stem 208 and a nozzle outlet 210. The nozzle outlet 210 leads to (or fluidly connects to) a gate defined by the mold assembly 108. The gate is an opening into the mold cavity 140. The valve stem 208 is arranged and sized to reciprocate so as to open and shut the nozzle outlet 210, thereby allowing and blocking the resin, respectively, to flow out of the nozzle outlet 210.

The shooting pot housing 204 houses a shooting pot plunger 132. The shooting pot plunger 132 is arranged to reciprocate within the shooting pot housing 204. An actuator (not shown) is used to reciprocate the shooting pot plunger

132. The shooting pot plunger 132 is of such a size that when it moves towards the shooting pot outlet 212 it forces or expels the resin out of the shooting pot cavity 130 through the shooting pot outlet 212.

Separate or dedicated actuators can be used to reciprocate respective shooting pot plungers 132. In implementations when there are more than one shooting pots 124, one or more of the shooting pot plungers 132 can independently actuate.

FIGS. 3A, 3B, 3C and 3D show an embodiment of the shooting pot 124 in isolation with the shooting pot plunger 132 in four different positions. The shooting pot 124 in FIGS. 3A, 3B, 3C, and 3D has a shooting pot housing 204 having a plunger end 302 and an outlet end 304. The shooting pot outlet 212 is defined at the outlet end 304 of the shooting pot housing 204. The shooting pot outlet 212 extends to or fluidly connects to an outlet passage 306 that is on the same linear axis as the reciprocal movement of the shooting pot plunger 132. In other embodiments, such as shown in FIG. 2, the shooting pot outlet 212 is defined on a side wall of the shooting pot housing 204 so that it does not lead directly to an outlet passage that is on the same linear axis as the reciprocal movement of the shooting pot plunger 132. In the embodiment shown in FIG. 3A, the outlet passage 306 leads to another passage that leads to the nozzle assembly 128 (not shown in FIGS. 3A, 3B, 3C, 4D). For example, the outlet passage 306 can lead to the injection melt passage 199 that passes through or is partially defined within the nozzle assembly 128.

Figures 3A, 3B, 3C, 3D:
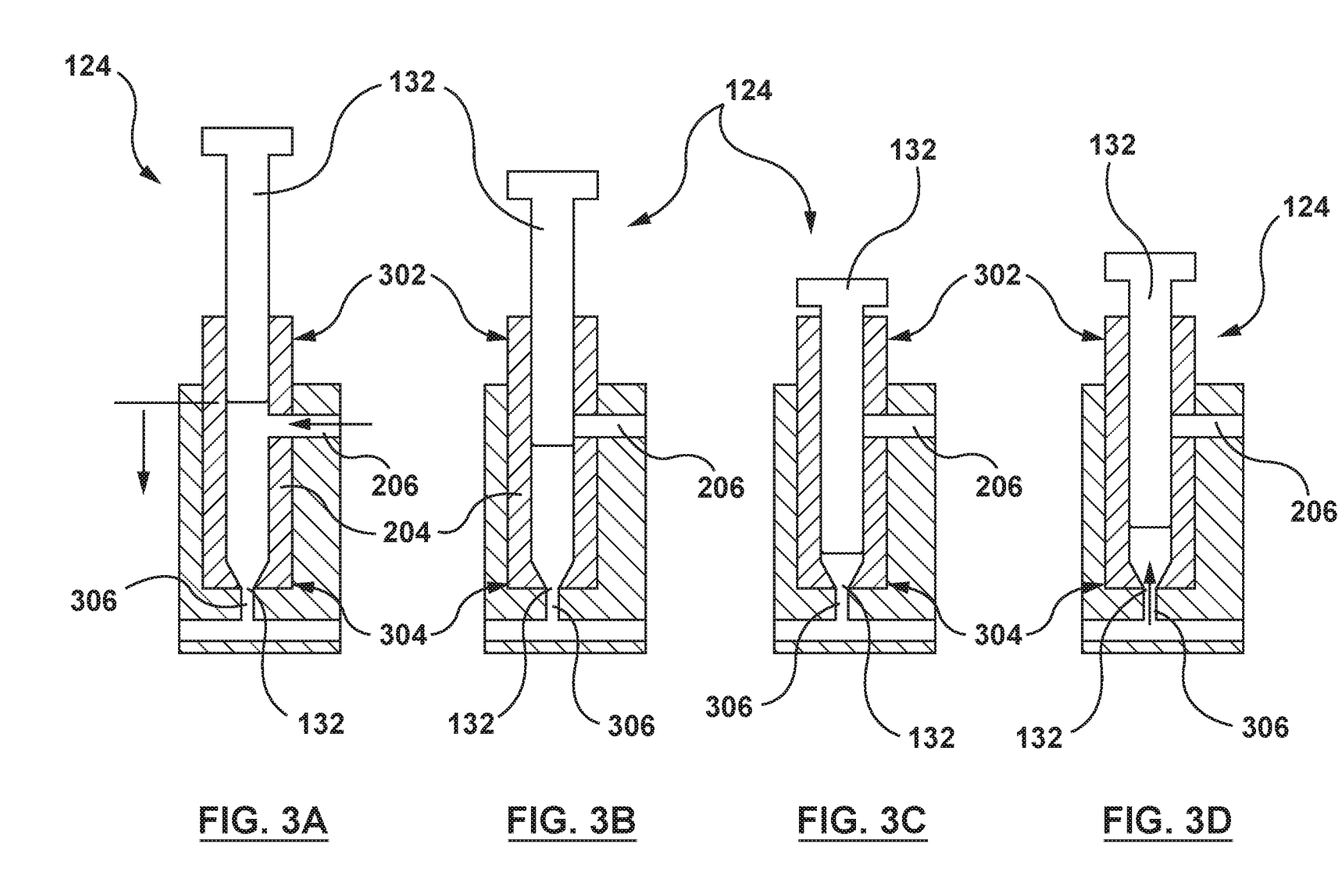
FIGS. 3A, 3B, 3C and 3D are side views of a showing pot in various stages of operation.

In FIG. 3A the shooting pot plunger 132 is retracted from the shooting pot housing 204. The retraction shown in FIG. 3A may be the maximum amount of retraction, although in other embodiments, the maximum retraction of the shooting pot plunger 132 can be more or less than is shown. When the shooting pot plunger 132 is in the retracted position (FIG. 3A), the shooting pot plunger 132 is not blocking the shooting pot inlet 206. This retracted position may also be identified as the "refill" position.

In FIG. 3B the shooting pot plunger 132 is partially retracted from the shooting pot housing 204. In this partial retraction position, the shooting pot plunger 132 is blocking the shooting pot inlet 206. In other words, resin cannot pass into the shooting pot cavity 130 because the shooting pot plunger is blocking the way. This partially retracted position may also be identified as the "ready" position.

In FIG. 3C the shooting pot plunger 132 is extended into the shooting pot housing 204. The shooting pot plunger 132 is blocking the shooting pot inlet 206 and is proximate to the shooting pot outlet 212. This extended position may also be identified as the "hold" position. In operation the shooting pot plunger 132 moves from a retracted position (e.g. the refill or ready position) to an extended position (e.g. the hold position). When the shooting pot plunger 132 is in the ready position and there is resin in the shooting pot cavity 130, the resin will be expelled out of the shooting pot outlet 212 when the shooting pot plunger 132 moves to the hold position.

The FIG. 3D, the shooting pot plunger 132 is retracted slightly from the shooting pot outlet 212. A slight retraction of the shooting pot plunger from the shooting pot outlet 212 can lower or relieve the pressure on the resin that is in the injection circuit. The injection circuit can consist of the injection melt passage 199. In some embodiments, the injection circuit can also include the shooting pot cavity 130. The shooting pot plunger 132 is thus in a partially retracted position in FIG. 3D. This partially retracted position can also be called the "decompression" position.

A shooting pot actuator (not shown) moves the shooting pot plunger 132 into each of the positions of FIGS. 3A, 3B, 3C and 3D. For example, the shooting pot actuator can move the shooting pot plunger 132 from the refill position to the ready position to the hold position and then to the decompression position with a predetermined motion profile.

In operation, when the shooting pot plunger 132 is in the refill position, resin enters through the shooting pot inlet 206 and into the shooting pot cavity 130 so as to fill the shooting pot cavity. While the resin is refilling the shooting pot cavity 130 the pressure on the resin in the shooting pot cavity 130 can be increasing (and thus the resin may compress). The shooting pot plunger 132 then moves to the ready position, causing further compression on the resin inside the shooting pot cavity 130 and blocking the shooting pot inlet 206. The shooting pot plunger 132 then extends to the hold positon and while doing so expels the resin out of the shooting pot cavity 130 and through the shooting pot outlet 212. The shooting pot plunger 132 can stay in the hold position while the mold assembly 108 is in the closed position. Then the shooting pot plunger 132 can retract to decompress the resin in the shooting pot cavity 130. The shooting pot plunger 132 can continue to retract to the ready position (blocking the shooting pot inlet 206) or, if the shooting pot cavity 130 is to be refilled, to the refill position.

In alternative configurations of the molding system 100, the shooting pot inlet 206 can be controlled by a valve that is separate and independent from the shooting pot plunger 132.

Each shooting pot 124 can be constructed and arranged so that it is refilled with melted resin and expels melted resin on a first-in first-out basis. In other words, the resin that first enters the shooting pot cavity 130 from the refill circuit is the same resin that is expelled first from the shooting pot cavity 130 into the injection circuit.

In another embodiment, each shooting pot 124 can be constructed and arranged so that it is refilled with melted resin and expels melted resin on a first-in last-out basis. In other words, the resin that first enters the shooting pot cavity 130 from the refill circuit is the resin that is last to be expelled from the shooting pot cavity into the injection circuit.

Operation

Figure 4:
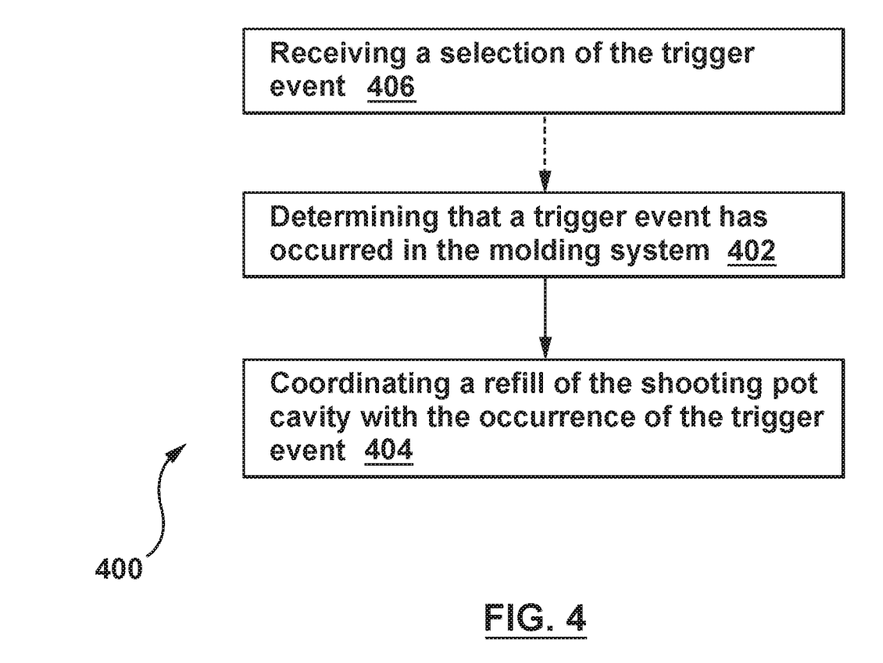
FIG. 4 is a flowchart depicting an exemplary method of refilling a shooting pot cavity in a molding system.

FIG. 4 is a flowchart depicting a method 400 of refilling a shooting pot cavity 130 in a molding system 100. The method 400 can be carried out on or by the control system 110 or controller 152.

At 402, it is determined that a trigger event has occurred in the molding system 100.

The trigger event can be one of a mold opening, a mold closing, a valve stem 208 being in a closed position, a shutoff valve blocking flow of melted resin into the shooting pot cavity 130, and a shooting pot plunger 132 being in a refill position. The occurrence of such a trigger event can be determined by the control system 110, or by a sensor 150 for example. In another example, the occurrence of the trigger event can be determined in relation to the time elapsed in the injection cycle. The controller can monitor the position or expected position of various moving parts in the molding system 100. This monitoring can be at various times during the injection cycle. So if the trigger event is a certain position of a moving part, then the controller will know the time during the injection cycle when that moving part is expected to be in the certain position. Alternatively, or additionally the moving parts or components of the molding system will send a signal or otherwise communicate with the controller 152 when such moving parts or components are in certain positions. Alternatively, or additionally, a sensor 150 or other data collection component can be used to determine various characteristics of such moving parts or components of the molding system 100 and these characteristics can be communicated to the controller 152. Based on these characteristics the controller 152 may be able to determine whether the trigger event has occurred.

Determining that a trigger event has occurred can mean determining that a shooting pot plunger 132 is in a predetermined position (the predetermined position would be known to the controller 152). For example, the predetermined position can be a fully retracted or fully extended shooting pot plunger 132.

Determining that a trigger event has occurred can mean determining that a predetermined time during the injection cycle has occurred. The control system 110 can measure the time of various events during an injection cycle and can have access to or know the time of various events during the injection cycle. The trigger event can be the expected occurrence of one or more of the events during an injection cycle.

Determining that a trigger event has occurred can mean determining that the movable platen 114 is at a predetermined position. For example, the predetermined position of the movable platen 114 can be a fully closed position.

Determining that a trigger event has occurred can mean determining that the valve stem 208 (or valve stems 208) is in a predetermined position. For example, the predetermined position of the valve stem 208 can be a fully retracted position or a fully extended position.

In some embodiments, the trigger event can be a predetermined number of injection cycles. For example, the number of injection cycles can be automatically counted, and after a (or each) predetermined number of injection cycles the determination is made that the trigger event has occurred.

At 404, the refill of the shooting pot cavity 130 is coordinated with the occurrence of the trigger event. This can mean that the shooting pot cavity 130 is refilled beginning when it is determined that the trigger event has occurred (at 402).

Coordinating a refill of the shooting pot cavity 130 can mean coordinating the extrusion of melted resin with the occurrence of the trigger event. Coordinating the extrusion of the melted resin with the occurrence of the trigger event can mean extruding the melted resin automatically in response to determining that trigger event has occurred. The control system 110 can perform this coordination. By way of example, an injection unit controller can be in communication with the controller 152 in order to actuate the injection unit in coordination with the occurrence of the trigger event. Similarly, the controller 152 can coordinate the movement of the shooting pot plunger 132 in order to allow refill of the shooting pot cavity 130.

In some embodiments, coordinating a refill of the shooting pot cavity 130 includes waiting a predetermined amount of time after the occurrence of the trigger event and then actuating the injection unit 104 to inject resin.

Coordinating a refill of the shooting pot cavity 130 can include refilling the shooting pot cavity 130 on a first-in first-out basis depending on the occurrence of the trigger event. Or, alternatively, coordinating a refill of the shooting pot cavity 130 can include refilling the shooting pot cavity 130 on a first-in last-out basis depending on the occurrence of the trigger event.

Optionally, at 406, a selection of the trigger event can be received. The selection of the trigger event is received before it is determined that the trigger event has occurred. For example, a selection out of one or more potential trigger events can be received at the user interface 156. By way of further example, the trigger event can be selected automatically based on the history of the use of the molding system 100.

In some embodiments multiple shooting pots 124 can be controlled independently. For example, determining 402 that a trigger event has occurred in the molding system 100 can further include determining that a second trigger event has occurred in the molding system 100, and the refill of a second shooting pot cavity 130 can be coordinated with the occurrence of the second trigger event. By way of further example, multiple groups of shooting pots 124 in a single molding system 100 that are fed by separate injection units 104 can be independently controlled based on similar or different trigger events.

In further embodiments, coordinating the refill of the shooting pot cavity 130 can include actuating an injection unit 104 to refill the shooting pot cavity 130, and coordinating the refill of the second shooting pot cavity 130 can include actuating a second injection unit 104 to refill the second shooting pot cavity 130.

If there are multiple shooting pots 124 being controlled then each shooting pot 124 can be controlled independently.

Other non-limiting embodiments, modifications and equivalents will be evident to one of ordinary skill in the art in view of the present disclosure.

This disclosure has presented one or more non-limiting exemplary embodiments. It will be clear to those skilled in the art that modifications and variations can be made to the disclosed non-limiting embodiments without departing from the intended scope of this disclosure. The described non-limiting embodiments ought to be considered to be merely illustrative of some of the features or elements of this disclosure as a whole. Other beneficial results can be realized by applying the non-limiting embodiments in a different manner or modifying them in ways known to those familiar with the art. Certain features or sub-features of one embodiment may be combined with certain features or sub-features of another embodiment to arrive at a combination of features not specifically described above but still within the intended scope of the disclosure. Any such suitable and workable combination of features would be known to persons skilled in the relevant art after reviewing the present disclosure.

What is claimed is:

1. A method of refilling a shooting pot cavity with resin in a molding system, the method comprising:
  receiving, at an input device a selection of a trigger event, wherein the trigger event is one of a mold opening, a mold closing, a valve stem being in a closed position, a shutoff valve blocking flow of melted resin to the shooting pot cavity, and a shooting pot plunger in a refill position;
  measuring, using a sensor, a property associated with the resin in the mold shooting pot cavity;
  determining, based on the measured property, that the trigger event has occurred in the molding system; and
  coordinating a refill of the shooting pot cavity so that the refill begins with the occurrence of the trigger event.

2. The method of claim 1, wherein determining that a trigger event has occurred comprises one of (i) determining that a shooting pot plunger is in a predetermined position, (ii) determining that a predetermined time during an injection cycle has occurred, (iii) determining that movable platen is at a predetermined positioned, and (iv) determining that the valve stem is in a predetermined position.

3. The method of claim 2, wherein the trigger event comprises a predetermined number of injection cycles.

4. The method of claim 3, wherein coordinating a refill of the shooting pot cavity comprises coordinating extrusion of melted resin with the occurrence of the trigger event.

5. The method of claim 3, wherein coordinating a refill of the shooting pot cavity comprises:
waiting a predetermined amount of time after the occurrence of the trigger event; and
actuating an injection unit to inject resin.

6. The method of claim 3, wherein coordinating a refill of the shooting pot cavity further comprises filling the shooting pot cavity on a first-in first-out basis.

7. The method of claim 6, wherein determining that a trigger event has occurred in the molding system further comprises: determining that a second trigger event has occurred in the molding system; coordinating a refill of a second shooting pot cavity with the occurrence of the second trigger event.

8. The method of claim 7, wherein coordinating the refill of the shooting pot cavity comprises actuating an injection unit (104) to refill the shooting pot cavity, and wherein coordinating the refill of the second shooting pot cavity comprises actuating a second injection unit to refill the second shooting pot cavity.

9. A control system for controlling a shooting pot plunger in a molding system, the control system comprising:
a memory for storing instructions;
an input device for receiving a selection of a trigger event;
a sensor for measuring a property associated with a resin in a shooting pot cavity;
a controller comprising a processor for executing instructions stored on memory to:
determining, based on the measured property, that the trigger event has occurred in the molding system; and
coordinating a refill of the shooting pot cavity to begin trigger event; and
wherein the trigger event is one of a mold opening, a mold closing, a valve stem being in a closed position, and a shutoff valve blocking flow of melted resin to the shooting pot cavity.

10. The control system of claim 9, wherein the memory stores trigger event data identifying the trigger event.

11. The control system of claim 9, wherein the controller is configured to receive data from a sensor for determining that a trigger event has occurred.

12. The control system of claim 11, wherein the controller is configured to receive data from a timer for determining the time during an injection cycle and for determining that a trigger event has occurred.

13. The control system of claim 12, wherein the trigger event is a predetermined time during the injection cycle.

14. The control system of claim 13, wherein coordinating the refill of the shooting pot cavity comprises the controller actuating an injection unit to inject resin.

15. The control system of claim 14, wherein the controller is configured to wait a predetermined amount of time after the occurrence of the trigger event before actuating the injection unit to inject resin.

* * * * *